(12) United States Patent
Johnson et al.

(10) Patent No.: US 7,514,053 B2
(45) Date of Patent: Apr. 7, 2009

(54) METHOD FOR REMOVING SULFUR DIOXIDE, MERCURY, AND NITROGEN OXIDES FROM A GAS STREAM

(75) Inventors: Dennis W. Johnson, Barberton, OH (US); Mark S. Ehrnschwender, Terrace Park, OH (US)

(73) Assignee: EnviroSolv Energy LLC, Terrace Park, OH (US)

( * ) Notice: Subject to any disclaimer, the term of this patent is extended or adjusted under 35 U.S.C. 154(b) by 378 days.

(21) Appl. No.: 11/111,630

(22) Filed: Apr. 21, 2005

(65) Prior Publication Data

US 2006/0239877 A1    Oct. 26, 2006

(51) Int. Cl.
*B01D 53/34* (2006.01)
*B01D 53/50* (2006.01)
*B01D 53/52* (2006.01)
*B01D 53/56* (2006.01)
*B01D 53/64* (2006.01)
*B01D 53/68* (2006.01)
*C01C 1/24* (2006.01)
*C01D 5/00* (2006.01)

(52) U.S. Cl. .......... 423/210; 423/235; 423/243.08; 423/244.07; 423/244.08; 423/240 R; 423/240 S; 423/220; 423/230; 423/396; 423/551

(58) Field of Classification Search .......... 423/210, 423/235, 243.08, 244.07, 240 R, 240 S, 220, 423/230, 396, 551, 244.08
See application file for complete search history.

(56) References Cited

U.S. PATENT DOCUMENTS

| | | | | |
|---|---|---|---|---|
| 3,896,214 A | * | 7/1975 | Newman | 423/243.06 |
| 3,949,057 A | | 4/1976 | Gilbert, Jr. | 423/239 |
| 3,957,949 A | | 5/1976 | Senjo et al. | 423/235 |
| 4,019,870 A | | 4/1977 | Gilbert, Jr. | 23/288 F |
| 4,035,470 A | | 7/1977 | Senjo et al. | 423/235 |
| 4,086,327 A | | 4/1978 | Ito et al. | 423/385 |
| 4,116,881 A | | 9/1978 | Shibata et al. | 252/440 |
| 4,186,176 A | | 1/1980 | Kitamura et al. | 423/235 |
| 4,252,553 A | * | 2/1981 | Pircon et al. | 71/37 |
| 4,263,021 A | | 4/1981 | Downs et al. | 55/73 |
| 4,425,313 A | * | 1/1984 | Cooper | 423/235 |
| 4,540,554 A | * | 9/1985 | Dayen | 423/235 |
| 4,999,167 A | | 3/1991 | Skelley et al. | 422/175 |
| 5,206,002 A | | 4/1993 | Skelley et al. | 423/235 |
| 5,220,875 A | * | 6/1993 | Cox | 110/345 |

(Continued)

OTHER PUBLICATIONS

Basile, Robert, "Dealing with Nitrogen Oxide Emissions," AB Plastics Inc., http://www.finishers-management.com/may2002/nox.htm.

(Continued)

*Primary Examiner*—Timothy C Vanoy
(74) *Attorney, Agent, or Firm*—Wood, Herron & Evans, L.L.P.

(57) ABSTRACT

Methods for scrubbing gas streams to remove acid gases including sulfur dioxide, mercury-containing substances, and/or nitrogen oxides from the gas stream. The gas stream is contacted with a potassium-based sorbent effective for removing at least a portion of the acid gases. The partially cleaned gas stream is then contacted with an oxidant effective to remove at least a portion of the nitrogen oxides and/or mercury-containing substances after partially removing the acid gas substance.

22 Claims, 1 Drawing Sheet

U.S. PATENT DOCUMENTS

| | | | | |
|---|---|---|---|---|
| 5,316,737 | A | 5/1994 | Skelley et al. | 422/170 |
| 5,328,673 | A | 7/1994 | Kaczur et al. | 423/235 |
| 5,591,417 | A | 1/1997 | Buchanan et al. | 423/210 |
| 5,595,713 | A | 1/1997 | Gohara et al. | 422/170 |
| 5,674,459 | A | 10/1997 | Gohara et al. | 322/170 |
| 5,895,634 | A | 4/1999 | Mitsuoka et al. | 423/220 |
| 5,900,042 | A * | 5/1999 | Mendelsohn et al. | 75/742 |
| 6,136,284 | A | 10/2000 | Hwang et al. | 423/235 |
| 6,143,263 | A | 11/2000 | Johnson et al. | 423/242.1 |
| 6,162,409 | A | 12/2000 | Skelley et al. | 423/239.1 |
| 6,303,083 | B1 | 10/2001 | Johnson et al. | 422/171 |
| 7,118,720 | B1 * | 10/2006 | Mendelsohn et al. | 423/235 |
| 2004/0062697 | A1 | 4/2004 | Mortson | |
| 2005/0214187 | A1 | 9/2005 | Johnson | |
| 2007/0154374 | A1 | 7/2007 | Johnson et al. | |

OTHER PUBLICATIONS

Lueck, Dale E., "Improved Process for Scrubbing and Treating NOx Liquor," John F. Kennedy Space Center, Florida, Jul. 9, 2003, http://www.nasatech.com/Briefs/Oct98/KSC11884.html.

Rochelle, Gary T. and Zhao, Lingband, "Hg Absorption in Aqueous Permanganate," AIChE Journal, Dec. 1996, vol. 42, No. 12.

Robinson, Steve, "First Aid for Air Pollution," The National Environmental Journal, May/Jun. 1993, pp. 50-53.

Rochelle, Gary T. and Zhao, Lynn, "Mercury Absorption in Aqueous Oxidants Catalyzed by Mercury (II)," Ind. Eng. Chem. Res., 1998 American Chemical Society, 37, pp. 380-387.

Sada, E. et al, "Absorption of NO In Aqueous Mixed Solutions of KMnO4," Chemical Engineering Science, 1977, vol. 32, pp. 1171-1175.

Sada, E. et al, "Absorption of NO in Aqueous Mixed Solutions of NaCIO2 and NaOH," Chemical Engineering Science, 1978, vol. 33, pp. 315-318.

Takeuchi, Hiroshi, et al, "Absorption of Nitrogen Oxides in Aqueous Sodium Sulfite and Bisulfite Solutions," Industrial Engineering Process Design & Development, vol. 16, No.3 , 1977.

Topol, Leo E., et al, "A Study of the Nitric Oxide-Concentrated Sulfuric Acid Reaction," Journal of Inorganic & Nuclear Chemistry, 1968, vol. 30, pp. 2977 to 2990.

Van der Vaart, Rick, et al, "Removal of Mercury from Gas Streams by Oxidative Membrane Gas Absorption," Journal of Membrane Science 187 (2001), pp. 151-157.

Chang, John C. S. and Ghorishi, S. Behrooz, "Simulation and Evaluation of Elemental Mercury Concentration Increase in Flue Gas across a Wet Scrubber," Environmental Science & Technology 2003, 37, 5763 -5766.

Yang, Chen-Lu, "Aqueous Absorption of Nitrogen Oxides Induced by Oxychlorine Compounds: A Process Development Study for Flue Gas Treatment," A Dissertation Submitted to the Faculty of New Jersey Institute of Technology, Jan. 1994.

Contardi, John S. and Overcamp, Thomas J., "Enhanced Elemental Mercury Capture Through Oxidation," Air & Waste Management Association's 91st Annual Meeting & Exhibition, Jun. 14-18, 1998, San Diego, CA.

Kaczur, Jerry J., "Oxidation Chemistry of Chloric Acid in NOx/SOx and Air Toxic Metal Removal from Gas Streams," Environmental Progress, vol. 15, No. 4, Winter 1996.

Kasper, John M., et al, "Control of Nitrogen Oxide Emissions by Hydrogen Peroxide-Enhanced Gas-Phase Oxidation of Nitric Oxide," Journal of the Air & Waste Management Association, vol. 46, Feb. 1996, pp. 127-133.

Livengood, C. David and Mendelsohn, Marshall H., "A Process for Combined Control of Mercury and Nitric Oxide," Paper No. 50, 94th Annual Conference & Exhibition of the Air & Waste Management Association, Orlando, Florida, Jun. 24-28, 2001.

Akzo Nobel/Eka Chemicals Purate, www.purate.com/MainHome-Main.htm, downloaded Jul. 9, 2003 (1 page).

Chironna, et al., "Chemical Aspects of NOX Scrubbing", 1999-2001 Environmental Expert, S.L. (6 pages).

FMC Corporation, "Nitrogen Oxide (NOx) Abatement with Hydrogen Peroxide", downloaded Jul. 9, 2003 (3 pages).

FMC Corporation, "Scrubbing Hydrogen Sulfide with Hydrogen Peroxide", downloaded Jul. 9, 2003 (3 pages).

FMC Corporation, "Inorganic Pollutant", FMC Technical Data, Pollution Control Release No. 119, downloaded Jul. 9, 2003 (2 pages).

http://airepur.hmet.fr/airepur.uk/products/uk_nox.htm "Treatment for NO, NOx SO2 Gas Scrubbing by Wet Processing", downloaded Jul. 9, 2003 (2 pages).

* cited by examiner

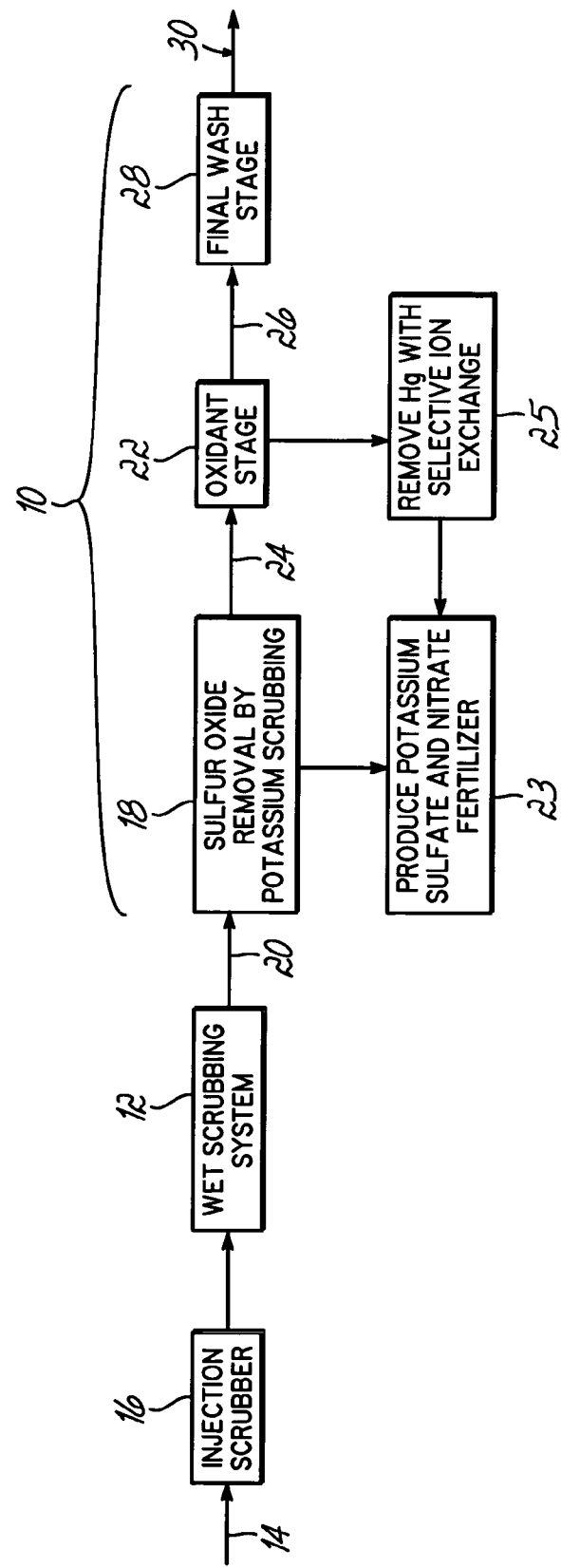

METHOD FOR REMOVING SULFUR DIOXIDE, MERCURY, AND NITROGEN OXIDES FROM A GAS STREAM

FIELD OF THE INVENTION

The present invention relates to methods for removing pollutants, such as sulfur dioxide, nitrogen oxides, mercury compounds, and elemental mercury (Hg), from gas streams and, in particular, to the removal using staged gas/liquid contact of mercury-containing substances and nitrogen oxides from gas streams, such as gas streams generated by the combustion of fossil fuels.

BACKGROUND OF THE INVENTION

In the pollution control field, several diverse approaches have been used to remove sulfur oxides ($SO_x$) and other contaminants from gas produced by the burning of a fossil fuel in order to comply with Federal and State emissions requirements. One conventional approach involves locating and utilizing fossil fuels lower in sulfur content and/or other contaminants. Another conventional approach involves removing or reducing the sulfur content and/or other contaminants in the fuel, before combustion, via mechanical and/or chemical processes. A major disadvantage to this approach is the limited cost effectiveness of the mechanical and/or chemical processing required to achieve the mandated reduction levels of sulfur oxides and/or other contaminants.

The most prevalent conventional approaches for removing sulfur oxides and/or other contaminants from gas streams involve post-combustion clean up of the gases. Several conventional methods have been developed to remove the sulfur dioxide ($SO_2$) species from gases.

One conventional approach for removing $SO_2$ from gas streams involves either mixing dry alkali material with the fuel prior to combustion, or injection of pulverized alkali material directly into the hot combustion gases to remove sulfur oxides and other contaminants via absorption or absorption followed by oxidation. Major disadvantages of this approach include fouling of heat transfer surfaces (which then requires more frequent soot blowing of these heat transfer surfaces), low to moderate removal efficiencies, poor reagent utilization, and increased particulate loading in the combustion gases which may require additional conditioning of the gas, such as humidification or sulfur trioxide injection, if an electrostatic precipitator is used for downstream particulate collection.

Another conventional approach for removing $SO_2$ from gas streams, collectively referred to as wet chemical absorption processes and also known as wet scrubbing, involves "washing" the hot gases with an aqueous alkaline solution or slurry in a gas-liquid contact device to remove sulfur oxides and other contaminants. Major disadvantages associated with these wet scrubbing processes include the loss of liquid both to the atmosphere due to, for example, saturation of the gas and mist carry-over, and to the sludge produced in the process, and the economics associated with the construction materials for the absorber module itself and all related auxiliary downstream equipment (i.e., primary/secondary dewatering and waste water treatment subsystems).

Yet another conventional approach for removing $SO_2$ from gas streams, collectively referred to as spray drying chemical absorption processes and also known as dry scrubbing, involves spraying an aqueous alkaline solution or slurry, which has been finely atomized via mechanical, dual-fluid or rotary type atomizers, into the hot gases to remove sulfur oxides and other contaminants. Major disadvantages associated with these dry scrubbing processes include moderate to high gas-side pressure drop across the spray dryer gas inlet distribution device and limitations on the spray down temperature (i.e., the approach to gas saturation temperature) required to maintain controlled operations.

There are several conventional methods for controlling emissions of nitrogen oxides ($NO_x$), which include nitric oxide (NO), nitrogen dioxide ($NO_2$), and dimers as principle components. Selective catalytic reduction (SCR) is the most common conventional approach. In this process, ammonia is injected and mixed with the gas at low to medium temperatures. The mixture then flows across a catalyst, often vanadium based over a stainless steel substrate, and the $NO_x$ is reduced to elemental nitrogen ($N_2$). Deficiencies of conventional SCR systems include the high initial cost, the high cost of ammonia which is thermally or chemically decomposed, and the introduction of ammonia into the gas stream causing problems with the formation of ammonium bisulfate and ammonia slip to the atmosphere.

Selective non-catalytic reduction (SNCR) methods are also employed for controlling $NO_x$ emissions. In these processes, ammonia or urea is injected into hot gases resulting in a direct reaction forming $N_2$. The problems with SNCR systems are the challenges with mixing and maintaining proper residence time and operating conditions for the reactions to take place optimally, sensitivity to changes in operating load, the high cost of ammonia which is thermally or chemically decomposed (even more than SCR's), and the introduction of ammonia into the gas stream causing problems with the formation of ammonium bisulfate and ammonia slip (as high as 50 ppm or higher) to the atmosphere. Dry injection of sodium bicarbonate ($NaHCO_3$) may also remove $NO_x$.

Wet chemical $NO_x$ reduction may use oxidants, such as hydrogen peroxide ($H_2O_2$). Hydrogen peroxide is an oxidizing agent for organic and inorganic chemical processing as well as semiconductor applications, bleach for textiles and pulp, and a treatment for municipal and industrial waste. Hydrogen peroxide is an effective chemical means of scrubbing nitrogen oxides and has been used for many years. The combined use of $H_2O_2$ and nitric acid ($HNO_3$) to scrub both NO and $NO_2$ is an attractive option because the combination handles widely varying rates of NO to $NO_2$, adds no contaminants to the scrubbing solution or blow-down/waste stream, and allows a commercial product to be recovered from the process, such as nitric acid or ammonium nitrate.

Gas scrubbing is another common form of $NO_x$ treatment, with sodium hydroxide being the conventional scrubbing medium. However, the absorbed $NO_x$ is converted to nitrite and nitrate salts that may present wastewater disposal problems. Scrubbing solutions containing hydrogen peroxide are also effective at removing $NO_x$, and can afford benefits not available with sodium hydroxide (NaOH). For example, $H_2O_2$ adds no contaminants to the scrubbing solution and so allows commercial products, such as nitric acid, to be recovered from the process. In its simplest application, $H_2O_2$ and nitric acid are used to scrub both NO and $NO_2$ from many utility and industrial sources. In addition to the methods cited above in which $NO_x$ is oxidized to nitric acid or nitrate salts, other conventional approaches reduce $NO_x$ to nitrogen using hydrogen peroxide and ammonia.

Several other processes use hydrogen peroxide to remove $NO_x$. The Kanto Denka process employs a scrubbing solution containing 0.2% hydrogen peroxide and 10% nitric acid while the Nikon process uses a 10% sodium hydroxide solution containing 3.5% hydrogen peroxide. Yet another process, the Ozawa process, scrubs $NO_x$ by spraying a hydrogen peroxide solution into the exhaust gas stream. The liquid is then separated from the gas stream and the nitric acid formed is neutralized with potassium hydroxide. Excess potassium nitrate is crystallized out and the solution reused after recharging with hydrogen.

$H_2O_2$ is used for the measurement of NO in the Standard Reference Method 7 of the Code of Federal Regulations (CFR) promulgated test methods published in the Federal Register as final rules by the United States Environmental Protection Agency (EPA). In this procedure, an $H_2O_2$ solution is used in a flask to effectively capture the $NO_x$.

There are at least two primary reasons that $H_2O_2$ has not gained widespread use as a reagent for removal of $NO_x$ in utility and large industrial applications. One reason is that $H_2O_2$ is not a selective oxidant. Most of these sources also contain other species, primarily $SO_2$, which are also effectively removed with hydrogen peroxide. Thus, a large quantity of $H_2O_2$ would be required compared to the amount of $NO_x$ removal sought. Even after a limestone scrubber, the amount of $SO_2$ present in gas may be equal to or greater than the amount of $NO_x$. Another reason that $H_2O_2$ has not gained widespread use is the cost, especially when much more $H_2O_2$ is required due to reactions with $SO_2$, for example, which may be better done prior to the $H_2O_2$ stage.

The overall reactions are:

$$3H_2O_2 + 2NO \rightarrow 2HNO_3 + 2H_2O \quad \quad 1)$$

$$H_2O_2 + 2NO_2 \rightarrow 2HNO_3 \quad \quad 2)$$

$$H_2O_2 + SO_2 \rightarrow H_2SO_4 \quad \quad 3)$$

Chlorine oxide ($ClO_2$) supplied at a rate of approximately 1.2 kg $ClO_2$/kg NO is effective for rapidly converting over 90% of gas phase NO in the gas stream to $NO_2$. This, of course, requires proper mixing conditions. $ClO_2$ is a significantly stronger oxidizer than hydrogen peroxide, sodium chlorate, or sodium chlorite. Ozone is also a possible oxidizer, but has greater capital costs relative to $ClO_2$ generators.

Sulfur dioxide reacts with chlorine dioxide in the gas phase to form sulfuric and hydrochloric acid.

$$2ClO_2 + 5SO_2 + 6H_2O \rightarrow 5H_2SO_4 + 2HCl \quad \quad 4)$$

Assuming $SO_2$ is the dominant species in the $ClO_2$ reaction in the presence of $SO_2$ and NO, excessive amounts of $ClO_2$ will be required to compensate for consumption by $SO_2$. This will reduce the economic feasibility of using $ClO_2$ for removing $NO_x$.

None of these conventional approaches for scrubbing gas streams, like gas streams, simultaneously removes mercury, mercury compounds, and $NO_x$, especially elemental mercury ($Hg^\circ$) removal. Mercury is volatilized and converted to $Hg^\circ$ in the high temperature regions of fossil fuel combustion devices. As the gas cools, Hg0 is oxidized to $Hg^{+2}$. In coal-fired combustors, $Hg^\circ$ may be oxidized to vapor phase mercuric oxide (HgO), mercuric sulfate ($HgSO_4$), mercuric chloride ($HgCl_2$), or some other vapor phase mercury compound.

Mercury may be captured, to a limited extent, using powdered activated carbon (PAC) sorbent. The activated carbon sorbent is injected into the gas stream, binds with the mercury in the gas, and captured downstream by a particulate matter control device. However, the mercury concentration in the gas stream may exceed the absorption ability of activated carbon sorbents. In addition, the performance of activated carbon sorbents may be adversely affected by low levels of chlorine in the gas. Carbon injection equipment is also relatively expensive.

Oxidized mercury ($Hg^{+2}$ such as in the form of $HgCl_2$), which are water-soluble, may be effectively captured in wet scrubbers used for $SO_2$ control that use an alkali reagent. However, this process also requires supplemental additives, such as sodium hydrogen sulfide (NaHS) or other sulfides, to chemically bind with the mercury and form compounds like mercury sulfide (HgS). However, $Hg^\circ$ is insoluble in water and must be adsorbed onto a sorbent or converted to a soluble form of mercury that can be collected by wet scrubbing.

For these and other reasons, it is desirable to provide methods for removing nitrogen oxides, sulfur dioxide, and mercury-containing substances, such as mercury and mercury compounds, from gas streams that overcome the various problems associated with conventional methods for scrubbing gas streams.

SUMMARY OF THE INVENTION

The present invention provides a method of scrubbing a gas stream containing at least one acid gas substance and a mercury-containing substance comprises contacting the gas stream with a potassium-based sorbent effective for removing at least a portion of the acid gas substance. The method further comprises contacting the gas stream with an oxidant effective to remove at least a portion of the mercury-containing substance after removing at least the portion of the acid gas substance.

In another embodiment of the present invention, a method of scrubbing a gas stream containing at least one acid gas substance and nitrogen oxides comprises contacting the gas stream with a potassium-based sorbent effective for removing at least a portion of the acid gas substance. The method further comprises contacting the gas stream with an oxidant effective to remove at least a portion of the nitrogen oxides after removing at least the portion of the acid gas substance.

One benefit of the present invention is that acid gas substance is removed from the gas stream using a lower cost sorbent. The use of a potassium alkali with oxidation produces a potassium sulfate final product from gas phase reactions. The potassium alkali may be made on site at the location of the scrubber from potassium chloride (KCl or potash). Conveniently, carbon injection equipment to capture mercury containing substances is not required because Hg, and other air toxics, are removed by the staged process steps of the invention.

Further advantages include, but are not limited to, the ability to custom design each add-on stage to meet the pollutant removal characteristics of the constituents removed in each individual stage and the ability to independently control and monitor the chemistry of each add-on stage to optimize the performance. Each add-on stage is isolated to prevent contamination of reagents/solutions and the solutions in each add-on stage are handled separately.

These and other advantages of the present invention shall become more apparent from the accompanying drawings and description thereof.

BRIEF DESCRIPTION OF THE DRAWING

The accompanying drawing, which is incorporated in and constitutes a part of this specification, illustrates embodiments of the invention and, together with a general description of the invention given above, and the detailed description given below, serves to explain the principles of the invention.

The FIGURE is a schematic representation of a scrubber arrangement in accordance with the principles of the present invention.

DETAILED DESCRIPTION

With reference to the FIGURE, a scrubber arrangement 10 constitutes a one to three stage add-on technology to a conventional scrubber arrangement. The principles of the invention apply to all scrubbing systems for gases that contain sulfur dioxide ($SO_2$), nitrogen oxides ($NO_x$), and mercury (Hg)-containing substances. The principles of the invention also apply to both new installations or modifications of existing units. Scrubber arrangement 10 is used to remove acid gases including $SO_2$, $NO_x$, and Hg from a gas stream using a staged approach in which acid gases are effectively removed by sulfur oxide removal stage 18 from gas stream 20 producing a second gas stream 24 which has essentially all acid gases removed. This clean gas 24 then proceeds to oxidant stage 22 where $NO_x$ and/or Hg are effectively captured producing a clean gas stream 26. For gases such as flue gases produced from the combustion of fossil fuels such as coal, coke, oil, and the like, this clean gas stream 26 would consist primarily of nitrogen, oxygen, water vapor, carbon dioxide, and other trace inert gases found in air such as argon, but is essentially devoid of pollutant gases. In some embodiments, the gas stream 26 leaving the oxidant stage 22 may contain some byproducts such as chlorine gas and the like that can be washed with water and/or an alkali solution to produce a very clean gas 30.

In another embodiment, the scrubber arrangement 10 is coupled with a wet scrubbing system 12 that receives a stream of gas 14 produced by a device combusting a fossil fuel or a gas from a chemical process. The wet scrubbing system 12 scrubs the gas stream 14 by using a conventional technology for accomplishing partial (i.e., <100%) removal of the acid gases, including $SO_2$ in the gas stream 14. To that end, the wet scrubbing system 12 contacts the gas in stream 14 with a scrubbing fluid that is typically composed of water and a basic chemical including, but not limited to, lime, calcium carbonate or limestone, soda ash or other sodium based alkalis, magnesium based alkalis, buffered calcium, and other calcium based alkalis, or mixtures of these materials. The scrubbing fluid may also include any of a number of additives intended to enhance removal, control chemistry, and reduce chemical scale. The wet scrubbing system 12 removes a large fraction of the $SO_2$ present in the gas stream 14, perhaps 90 to 98%, or even higher, using scrubbing fluids including sodium-based, magnesium-based, or calcium-based alkalis, but does not effectively remove $NO_x$, especially NO, or Hg containing substances, especially elemental Hg.

An injection scrubber 16 may optionally pre-condition the gas in stream 14 before the gas stream 14 is introduced into the wet scrubber 12. The injection scrubber 16 injects absorbents, reagents, adsorbents, or sorbents to reduce a portion of the $SO_3$ in the gas stream 14. A portion of the $SO_2$, HCl, $NO_x$, or other acid gases such as HF and $H_2S$, may also be removed by the operation of the injection scrubber 16. The injection scrubber 16 may use either wet or dry injection with any of multiple different alkali substances at any of several possible and known locations or temperature zones from the source of the gas stream 14 to the inlet of the wet scrubber 12. The injection is preferably a dry sodium bicarbonate ($NaHCO_3$) injection because $NaHCO_3$ also efficiently reacts with sulfur trioxide ($SO_3$), $NO_x$, $SO_2$, and other acid gases, present in the gas stream 14. When injection of sorbents is employed in the injection scrubber 16, the need for a conventional wet electrostatic precipitator is eliminated because sulfuric acid mist is not formed when the $SO_3$ is effectively removed by injection scrubber 16 upstream of the wet scrubbing system 12.

Following the optional injection step using the injection scrubber 16, wet scrubbing system 12, as described above, is used to remove $SO_2$ and acidic $NO_x$ compounds, such as $NO_2$, $N_2O_3$ and $N_2O_5$ and their associated dimers (e.g., $N_2O_4$). Conversion of NO to $NO_2$ by sodium bicarbonate injection was considered undesirable because the $NO_2$ was a brown gas that was not captured by the downstream equipment. In this case, however, the wet scrubbing system 12 can effectively capture some of the $NO_2$, $N_2O_5$, etc. when a sodium-based alkali is used. Some of the NO is captured directly by the sodium bicarbonate. However, NO is not effectively captured with sorbents such as lime, limestone or other calcium-based alkalis, magnesium-based alkalis, or sodium-based alkalis.

In accordance with the principles of the present invention and with continued reference to the FIGURE, the scrubber arrangement 10 includes an $SO_2$ removal stage 18 that removes $SO_2$ in a gas stream 20 supplied from the wet scrubbing system 12. Preferably, the $SO_2$ removal stage 18 is a polishing step that effectively removes all, or substantially all, of $SO_2$ in gas stream 20 remaining after treatment in the wet scrubbing system 12. The $SO_2$ removal stage 18 will include appropriate mass transfer surfaces, including but not limited to any conventional combination of sprays, packing, bubble cap trays, etc., or is housed in a separate vessel, to isolate the $SO_2$ reagent stream from the lower stage acid gas absorber stage supplied by the wet scrubbing system 12.

In one embodiment of the present invention, the $SO_2$ removal stage 18 is a reaction zone that uses a potassium alkali, preferably potassium hydroxide (KOH), as a reagent or reactant. If KOH is used as the reactant, potassium sulfate ($K_2SO_4$) is produced by the following overall reaction:

$$2KOH + SO_2 + \tfrac{1}{2}O_2 \rightarrow K_2SO_4 + H_2O \qquad 5)$$

The KOH used in the $SO_2$ removal stage 18 may be purchased or, alternatively, may be produced from potash (KCL) on site using conventional methods such as electrochemical methods as understood by persons of ordinary skill in the art. This constitutes one advantage over the use of sodium-based sorbents for $SO_2$ removal. If produced by electrochemical methods, KCl is split to produce KOH and HCl. The KOH is used in the $SO_2$ removal stage 18 to produce $K_2SO_4$ and the byproduct HCl may be sold or used elsewhere.

Preferably, a significant portion or, most preferably, substantially all of $SO_2$ in the gas stream 14 is removed before the oxidant stage 22. If $SO_3$ is not present in gas stream 14, the injection scrubber 16 may be eliminated.

The oxidant stage 22 removes at least a portion of the $NO_x$, primarily in the form of NO, $NO_2$, or other dimers, and mercury, either in an elemental form or oxidized form from a gas stream 24 supplied from the upstream $SO_2$ removal stage 18 and discharges a gas stream 26 that is highly depleted of these substances. Preferably, the oxidant stage 22 removes a significant portion or, most preferably, substantially all of the Hg and $NO_x$ from gas stream 24. The oxidant stage 22 may use a tray, like a bubble cap tray, or a separate vessel to hold the reagent, in this case an oxidant stream, separate from the lower stages so as to not interfere with the operation of the injection scrubber 16, the wet scrubber 12, and the $SO_2$ removal stage 18. Mass transfer surfaces such as additional trays, sprays or packing may be added to the oxidant stage 22, as required. In one embodiment, the oxidant stage 22 is an integral reaction zone that recirculates an aqueous solution of oxidant and reaction products to effectively and simultaneously remove all of the $NO_x$ and a significant fraction of the mercury.

The gas steam 26 exiting oxidant stage 22 is free or substantially free of $SO_x$, which is effectively removed upstream of the oxidant stage 22 by the wet scrubber 12, the injection scrubber 16, and the $SO_2$ removal stage 18. Moreover, the gas steam 26 is depleted of up to 90% to 99% or more of the initial mercury and $NO_x$ in the gas stream 14. Hence, the scrubber arrangement 10 is capable of eliminating a significant portion, if not substantially all, of the Hg, $SO_x$, and $NO_x$ contamination from gas stream 26.

The oxidant stage 22 is selected contingent upon the desired level of removal of $NO_x$ and/or Hg containing-substances. Candidate oxidants that are useful for capture of $NO_x$ and/or Hg or Hg compounds include, but are not limited to, the following substances:

1) Hydrogen Peroxide
2) Hydrogen Peroxide/Nitric Acid Solution ($H_2O_2$/$HNO_3$)
3) Hydrogen Peroxide/Nitric Acid/Hydrochloric Acid Solution ($H_2O_2$/$HNO_3$/HCl)
4) Sodium Chlorate Solution ($NaClO_3$)
5) Sodium Chlorite Solution ($NaClO_2$)
6) Sodium Hypochlorite Solution (NaClO)
7) Sodium Perchlorite Solution ($NaClO_4$)
8) Chloric Acid Solution ($HClO_3$)
9) Oxone Solution ($2KHSO_5$-$KHSO_4$-$K_2SO_4$ Triple Salt)
10) Potassium Chlorate Solution ($KClO_3$)
11) Potassium Chlorite Solution ($KClO2$)
12) Potassium Hypochlorite Solution (KClO)
13) Potassium Perchlorite Solution ($KClO_4$)
14) Potassium Permanganate ($KMnO_4$)
15) Potassium Permanganate/Sodium Hydroxide Solution Other oxidants, or combinations of oxidants, may be used in the oxidant stage 22. Further, sodium carbonate and sodium bicarbonate, or other alkalis, may be substituted for the sodium hydroxide solutions used for pH adjustment and to provide the ions for complete reactions. Oxidants may be selected to remove only $NO_x$, to exclusively remove elemental Hg and mercury compounds, or to simultaneously remove $NO_x$, elemental Hg, and mercury compounds. Metal ions that promote oxidation, including but not limited to iron, cobalt, and manganese, may be added to the oxidant used in the oxidant stage 22.

With regard to the use of sodium hypochlorite (NaClO) in the oxidant stage 22, potential chemical reactions between NaOCl and $NO_x$ and Hg include:

$$2NO+3NaClO+2NaOH \rightarrow 2NaNO_3+3NaCl+H_2O \quad 6)$$

$$2NO+3NaClO+Na_2CO_3 \rightarrow 2NaNO_3+3NaCl+CO_2\uparrow \quad 7)$$

$$2NO+3NaClO+2NaHCO_3 \rightarrow 2NaNO_3+3NaCl+ \\ 2CO_2\uparrow+H_2O \quad 8)$$

$$2NO_2+NaClO+2NaOH \rightarrow 2NaNO_3+NaCl+H_2O \quad 9)$$

$$2NO_2+NaClO+Na_2CO_3 \rightarrow 2NaNO_3+NaCl+CO_2\uparrow \quad 10)$$

$$2NO_2+NaClO+2NaHCO_3 \rightarrow 2NaNO_3+NaCl+2CO_2\uparrow+ \\ H_2O \quad 11)$$

$$2Hg+4NaClO+2H_2O \rightarrow 2HgCl_2+4NaOH+O_2 \quad 12)$$

In these chemical reactions, an additional source of sodium, such as bicarbonate, carbonate or hydroxide, may be provided to balance the reaction and to limit the potentially deleterious reaction of liberating $Cl_2$, $ClO_2$, or other undesirable gases. The addition of the sodium source would eliminate the need for a final wash stage 28.

One reaction product of the $NO_x$ reactions with NaOCl, and with other candidate oxidants, is sodium nitrate. This $NaNO_3$ may be converted to ammonium nitrate, a high value fertilizer product, by reaction with ammonia and carbon dioxide or ammonium bicarbonate, as indicated diagrammatically by reference numeral 23 in the FIGURE. The value of the fertilizer product may produce a revenue stream that offsets a portion of the cost of the equipment and consumables used in the scrubber arrangement 10. This conversion reaction will also produce sodium bicarbonate. The mercury, in the form of mercury chloride, may be separated from the oxidant solution using mercury specific ion exchange resins, as diagrammatically shown in the FIGURE with reference numeral 25, and the nitrogenous product converted to fertilizer in block 23. Of course, mercury separation in block 25 is optional if the gas stream 24 treated by oxidant stage 22 does not contain mercury-containing substances or if the oxidant used in oxidant stage 22 does not remove mercury-containing substances from gas stream 2.4

Gaseous oxidants such as ozone ($O_3$) or chlorine dioxide ($ClO_2$) may be injected into or produced by reaction in the gas stream 24 supplied to the oxidant stage 22 with, preferably, all or substantially all of the $SO_2$ originally in gas stream 14 removed upstream of oxidant stage 22. With proper mixing and sufficient residence, such gaseous oxidants are capable of oxidizing NO or Hg in the gas phase. Such gaseous oxidants may be capable of oxidizing NO not only to $NO_2$ but also to $N_2O_5$, which rapidly reacts with water or alkaline solutions to form nitric acid or nitrates.

The scrubber arrangement 10 may further include the optional final wash stage 28 to treat gas stream 26. The wash stage 28, if present, washes the gas in gas stream 26 to ensure that any byproducts from the oxidant stage 22, like chlorine gas, $NO_2$, etc., are removed. To that end, the final wash stage 28, if required, contacts the gas stream 26 with water or an appropriate solution effective to remove these byproducts, if present.

A gas stream 30 ultimately discharged from the scrubber arrangement 10 is advantageously depleted of, preferably, all or substantially all $SO_x$, $NO_x$, Hg, and Hg compounds. This represents a principle benefit of the scrubber arrangement 10 of the present invention.

Further details and embodiments of the invention will be described in the following example.

EXAMPLE

Bench-scale screening of potential solutions for capturing $NO_x$ and elemental mercury (Hg°) was performed using a simple gaseous mixture (Hg°+NO+$NO_2$+$CO_2$+$H_2O$+$N_2$+$O_2$) and an impinger sampling train similar to that described in the American Society of Testing and Materials Method D6784-02 (Ontario Hydro method). Testing identified solutions that effectively removed both $NO_x$ and Hg°. The results are shown in the following table:

TABLE 1

BENCH SCALE TEST RESULTS

| Solution | $NO_x$ Removal or NO Conversion to $NO_2$ | Hg Removal (Hg Total and Hg°) |
|---|---|---|
| Hydrogen Peroxide | Low | Low |
| Nitric Acid (40%) + Hydrogen Peroxide | 30-40% | 30-40% |
| Acidified Potassium Permanganate | 30-40% | ~100% |
| Chloric Acid | Low | 30-40% |
| 0.1 M NaClO pH adjusted to 3.74 using | ~100% | ~100% |
| 0.25 mole/L $KMnO_4$ + 2.5 mole/L NaOH | ~98% (about 4 ppm) | ~100% |

TABLE 1-continued

BENCH SCALE TEST RESULTS

| Solution | $NO_x$ Removal or NO Conversion to $NO_2$ | Hg Removal (Hg Total and Hg°) |
|---|---|---|
| (pH of 11.3) | passed through) | |
| 0.1 M NaClO, pH adjusted to 6 using HCl | 75-95% | ~100% |
| NaClO pH adjusted to 5 using HCl | ~70% | ~100% |

The results in Table 1 indicate that there are several possible candidate solutions from which to choose. Even the situations that show medium removal ranges such as (nitric acid (40%)+hydrogen peroxide) or acidified potassium permanganate will remove at higher rates with an appropriate modification to the mass transfer means. The oxidant selected, will then be based on economics, availability, desired level of capture, and/or desired end product. The results in Table 1 also indicate the relative ineffectiveness of $H_2O_2$ alone for $NO_x$ removal and Hg removal.

While the present invention has been illustrated by a description of various preferred embodiments and while these embodiments have been described in considerable detail in order to describe the best mode of practicing the invention, it is not the intention of applicants to restrict or in any way limit the scope of the appended claims to such detail. Additional advantages and modifications within the spirit and scope of the invention will readily appear to those skilled in the art. The invention itself should only be defined by the appended claims, wherein,

We claim:

1. A method of scrubbing a gas stream containing carbon dioxide, at least one acid gas substance, nitrogen oxides, and a mercury-containing substance, the method comprising:
   contacting the gas stream with a first sorbent effective for removing at least a portion of the acid gas substance; and
   after removing the portion of the acid gas substance, removing at least a portion of the nitrogen oxides and mercury-containing substance from the gas stream by contacting the gas stream with a re-circulating aqueous solution containing an oxidant, wherein the portion of the nitrogen oxides and mercury-containing substance is oxidized, captured, and completely removed from the gas stream by the aqueous solution to produce a gas stream flow free from the portion of the nitrogen oxides and mercury-containing substance.

2. The method of claim 1 wherein the first sorbent is potassium-based.

3. The method of claim 2 wherein the potassium-based first sorbent is selected from the group consisting of potassium bicarbonate, potassium carbonate, potassium hydroxide, and combinations thereof.

4. The method of claim 3 wherein the potassium-based first sorbent is potassium hydroxide, and further comprising:
   producing the potassium hydroxide from potassium chloride.

5. The method of claim 2 wherein the acid gas substance includes sulfur dioxide and the potassium-based first sorbent removes substantially all of the sulfur dioxide.

6. The method of claim 2 wherein the acid gas substance includes sulfur dioxide and the potassium-based first sorbent produces a reaction product from the sulfur dioxide, and further comprising:
   oxidizing the reaction product; and
   processing the oxidized reaction product to produce a product containing potassium sulfate.

7. The method of claim 2 wherein the gas stream is contacted with a scrubbing system that partially removes the acid gas substance before contacting the gas stream with the potassium-based first sorbent.

8. The method of claim 7 wherein the potassium-based first sorbent removes substantially all of the acid gas substance remaining after contact with the scrubbing system.

9. The method of claim 7 wherein the gas stream is contacted with a second sorbent from an injection system that partially removes the acid gas substance before contacting the gas stream with the scrubbing system.

10. The method of claim 9 wherein the potassium-based first sorbent removes substantially all of the acid gas substance remaining after contact with the scrubbing system.

11. The method of claim 2 wherein the gas stream is contacted with a second sorbent from an injection system that partially removes the acid gas substance before contacting the gas stream with the potassium-based first sorbent.

12. The method of claim 11 wherein the potassium-based first sorbent removes substantially all of the acid gas substance remaining after contact with the second sorbent.

13. The method of claim 1 wherein removing at least a portion of the nitrogen oxides and mercury-containing substance from the gas stream comprises removing at least a portion of the nitrogen oxides as a nitrogenous reaction product and further comprising:
   converting the nitrogenous reaction product to ammonium nitrate.

14. The method of claim 13 wherein converting the nitrogenous reaction product to ammonium nitrate further comprises:
   combining the nitrogenous reaction product with ammonia and carbon dioxide.

15. The method of claim 1 further comprising:
   separating the mercury-containing substance from the oxidant, after contact of the oxidant with the gas stream, using mercury specific ion exchange resins.

16. The method of claim 1 wherein the oxidant in the aqueous solution is selected from the group consisting of hydrogen peroxide, sodium chlorate, sodium chlorite, sodium hypochlorite, sodium perchlorite, chloric acid/sodium chlorate, chloric acid, potassium chlorate, potassium chlorite, potassium hypochlorite, potassium perchlorite, potassium permanganate, and combinations thereof.

17. The method of claim 16 wherein the solution further includes an acid selected from the group consisting of nitric acid, hydrochloric acid, sulfuric acid, and combinations thereof.

18. The method of claim 16 wherein the solution further includes an alkali.

19. The method of claim 18 wherein the alkali is selected from the group consisting of caustic soda, sodium carbonate, sodium bicarbonate, and combinations thereof.

20. The method of claim 16 wherein the solution further includes metal ions.

21. The method of claim 1 wherein the acid gas substance includes compounds of $SO_x$, $NO_x$, HCl, HF, $H_2S$, and combinations thereof.

22. The method of claim 1 further comprising:
   contacting the gas stream with a final wash effective to remove any byproducts from reactions between the oxidant and the gas stream.

* * * * *